United States Patent Office 3,673,031
Patented June 27, 1972

3,673,031
METHOD OF PRODUCING A LAMINATE FOR USE AS A LAYER IN A CORRUGATED BOARD
Veikko Mauri Moilanen, Imatra, Finland, assignor to Enso-Gutzeit Osakeyhtio, Imatra, Finland
No Drawing. Continuation-in-part of application Ser. No. 579,453, Sept. 6, 1966. This application July 2, 1970, Ser. No. 52,069
Int. Cl. B31f 1/22
U.S. Cl. 156—206
5 Claims

ABSTRACT OF THE DISCLOSURE

A method of producing a laminate for use in making corrugated board which is strong and resistant to severe weather conditions and which withstands rough handling. A substantially uniform layer of synthetic resinous material is applied between two webs of fibrous material, which material can be glued with conventional water miscible glues, the resinous material layer is bonded to the webs without finally hardening the layer, so that the laminate may then be shaped and the layer finally hardened.

---

This application is a continuation-in-part of the application Ser. No. 579,453 filed Sept. 6, 1966, now abandoned.

BACKGROUND OF THE INVENTION

Field of the invention

This invention relates to a method of producing a laminate for use in making corrugated board. There has long been a demand for corrugated boards having good compressive strength and elasticity and being at the same time water resistant so that the said strength properties do not deteriorate too much even if the board is exposed to severe conditions of humidity for an extended period of time. For many packaging purposes it is also desirable to have a corrugated board that is pervious to air and gases so that the package is "breathing."

Description of the prior art

It has been suggested to improve the properties of conventional corrugated board by making the surface thereof water resistant and in some instances also aroma tight, e.g. by coating it with a thin wax or plastic layer or an aluminium foil. The improvement obtained by these measures, however, is not sufficient to give protection for any extended period or against severe conditions. Once the corrugated board behind the protective surface layer has been wet, its mechanical strength decreases to such an extent that it cannot any more offer the desired protection. Package boxes made of such corrugated board are therefore not suitable for use in tropical conditions or otherwise where the package may be exposed to rain or rough handling.

It has also been proposed to make various materials for packaging and insulation purposes by impregnating fibrous sheet materials, such as paper, paper board, asbestos and glass fibers, with a resin material and then form the impregnated sheet material as desired, e.g. corrugating it, and finally cure the resin material. The materials produced in this manner cannot be formed to corrugated boards using conventional water miscible glues.

SUMMARY OF THE INVENTION

The method according to the invention of producing a laminate for use as a layer in a corrugated board comprising at least one fluted layer and at least one liner lamina, comprises the steps of forming a substantially uniform intermediate layer having a weight of at most 100 g./m.$^2$ and consisting of a thermosetting resin containing a plasticiser between two webs selected from paper and paper board, said webs having a weight per unit area at least as great as that of said intermediate lamina, bonding said webs and resin lamina to each other without essentially impregnating said webs with said resin anid without completely hardening said resin to form a laminate having surfaces capable of being glued with water miscible paper glues and paper board glues, and said laminate being mouldable after a period of storage.

A laminate prepared in accordance with the method of the invention will have an unimpregnated surface which is easily glued by means of conventional paper and paper board glues in corrugated board machines operating at high speed. The surface may also be printed or decorated in any desired manner. Further, the unimpregnated surface layers of the laminate render the whole structure flexible without becoming brittle which would be the case if they were impregnated with the resin. This feature is essential with respect to the further treatment, corrugating, bending etc. of the laminate to a finished product. Although the laminate is flexible, it possesses at the same time a substantial stiffness in dry condition due to the said outer layers, especially when these consist mainly of cellulose fibers. The intermediate resin layer, on the other hand, remains sufficiently stiff in wet condition to impart the desired rigidity to the structure, even in case the laminate or the final product including it is entirely soaked with water.

DESCRIPTION OF THE PREFERRED EMBODIMENTS

In the following a preferred method of producing a laminate which is suitable to be used as a raw material for corrugated boards will be described.

This method comprises the steps of applying between two webs of a fibrous material which can be glued with conventional water miscible paper and board glues, a substantially uniform layer of a thermosetting resin, and bonding said webs and said resin layer to each other under conditions avoiding final hardening of said thermosetting resin to form a laminate capable of being shaped and finally hardened.

The substantially uniform laminating layer of a thermosetting resin may advantageously be formed by applying the resin in the form of a solution or dispersion and thereafter evaporating the solvent or dispersion liquid, preferably using pressure in order to obtain the desired uniform thickness of the laminate. Extrudable or mouldable thermosetting resins may of course be applied by extruding. It is also possible to apply the resin in an apparent dry, finely divided form, or as a film.

A solution or a dispersion of the resin should be as little diluted as possible with water or whatever the solvent or dispersion liquid may be, because the evaporation of the liquid may cause difficulties, and on the other hand the resin may penetrate so deep into the paper or board that it will be detrimental to gluing with conventional water miscible paper and board glues. The conditions should be chosen so that a thin, substantially continuous laminating resin layer will be obtained upon evaporation of the liquid. Thereafter or in connection therewith, pressure is applied to the laminate in order to obtain a uniform thickness, e.g. by feeding the laminate through a pair of press rolls. The pressure should be regulated so that the resin will not penetrate substantially into the paper or board forming the surface layers of the laminate. The evaporation of the solvent or the dispersion liquid should be performed using such a low temperature that final hardening of the resin is avoided.

The surface layers of the laminate may advantageously be made of so-called wet-strength paper or board qualities in order to obtain the desired water resistance. Thus, good results have been obtained using wet-strength kraft paper having a weight of about 70 g./m.$^2$, and a wet strength of about 30%, e.g. 33%, of the dry tensile strength (moisture content 65%), the wet strength being produced by means of a cationic urea formaldehyde resin, preferably in combination with alum. Depending on the use for which the laminate is intended, it is also possible to use thinner or thicker paper (or paper board) qualities. However, when using especially thin qualities, the laminate tends to become too hard and brittle, whereas when using essentially thicker qualities, the mouldability of the laminate will be detrimentally affected.

As an example of a laminating resin which is suitable for the purpose of the invention urea resin may be mentioned. A normal commercial urea resin is, however, too hard and brittle as such wherefore it has to be modified by adding softeners. A suitable softener is for example polyvinyl acetate (PVAc). In case borate has been used in the manufacture of the urea resin, a polyvinyl acetate quality free of any polyvinyl alcohol should be used in order to prevent precipitation. Otherwise any suitable polyvinyl acetate quality may be used.

The resin should also contain a hardener for improving the water resistance thereof. As is well known, there are two main types of hardeners, viz. cold hardeners and hot hardeners. Both types are suitable for the purpose of the invention. As cold hardener there may be used e.g. ammonium chloride, and as hot hardener, e.g. a mixture of ammonium chloride, water and concentrated ammonia. In both cases a preferred ratio between the urea resin and the softener (PVAc) for obtaining sufficient elasticity is from about 3.1:1 to about 1.1:1 calculated on a dry basis. The amount of the hardener may be up to about 10% of hot hardener and up to about 2% of cold hardener calculated on the total weight of the urea resin. By varying the amount and the type of the hardener it is possible to regulate the properties of the final laminate.

With respect to the thickness of the laminating resin layer, an amount of abut 60 g./m.$^2$ has been found suitable in combination with the above-mentioned paper quality having a weight of 70 g./m.$^2$. If thinner paper qualities are used, the thickness of the resin layer should be decreased correspondingly, e.g. down to 30 g./m.$^2$. It would, of course, also be possible to increase the thickness of the resin layer. However, it has turned out that with a view to the mouldability of the laminate formed, the thickness of the laminating resin layer should not exceed 100 g./m.$^2$.

It is self-evident that it would be possible to use also other thermosetting resins than urea resins. So for example phenolic resins are well suited for the purpose of the invention, especially in the form of a film consisting of thin paper impregnated with the phenolic resin. Conventional commercial grades are, however, not suitable for the purpose concerned because they would render the laminate formed too hard and brittle. The phenolic resins should therefore be modified by means of suitable softeners which are well known in the art and in a similar manner to that explained above in connection with the urea resins. The thickness of the film is advantageously of the same order as indicated above with respect to the laminating resin layer. A film weight 60 g./m.$^2$ may be mentioned as an example, wherein the weight of the paper base is 20 g./m.$^2$ and that of the resin consequently 40 g./m.$^2$. When using a resin film the laminate layers are pressed using such pressure and temperature conditions for such restricted time that a satisfactory bond is formed between the laminating layer and the surface layers but the laminating resin does not penetrate too deep into said surface layers, and the resin does not harden finally. In this connection it should be pointed out that it is possible to use also a urea resin in the form of a film.

If the laminate is to be used for corrugated boards intended for packaging purposes where it is essential that the package is pervious to water vapor, a thermosetting resin should be selected that is pervious to the said media in thicknesses corresponding to a weight up to at least 100 g./m.$^2$. Urea resins and phenolic resins meet this requirement.

A laminate produced with the above described method will remain mouldable into any desired shape for an extended period of time, and by heat treatment it may be finally hardened and rendered shape permanent, hard, elastic and water resistant. The laminate can be glued with conventional water based paper and board glues, such as described, and naturally also with water resistant glues, such as urea, phenolic and resorcinolic resin glues.

As already mentioned, the thus produced laminate is well suited for the manufacturing of a corrugated board and especially for making the fluted layer thereof.

The following example illustrates the invention.

Two sheets of brown wet-strength kraft paper having a weight of 70 g./m.$^2$ and a wet strength of 32% which was achieved by using a cationic urea resin in combination with alum, were laminated with 60 g./m.$^2$ (dry substance) resin composition. The resin composition comprised a urea resin (67% dry substance) and polyvinyl acetate (60% dry substance) in a ratio of 2:1, and 10% of a hardener calculated on the urea resin. The hardener used comprises a mixture of 25 grams of ammonium chloride, 60 grams of water and 30 grams of concentrated ammonia. Thus a laminate was produced having a weight of about 200 g./m.$^2$.

On the corrugated board machine a corrugated board was made comprising one fluted layer and two liners, all being made of the above-mentioned laminate. On the corrugated board machine resorcinol adhesive was used, the machine was run at a speed of 60/m. min. and using normal working conditions. The weight of the produced corrugated board was about 720 g./m.$^2$. Subsequently the corrugated board was subjected to a heat treatment in order to finally harden the urea resin of the laminating layers.

Sleeves having a size of 12 x 12 x 15 (height) cm. were made of this corrugated board as well as of conventional corrugated board of the same weight and of waxed conventional corrugated board weighing about 800 g./m.$^2$ and the compressive strength of the sleeves was measured in dry condition (65% moisture) and in wet condition after soaking in water for one hour. In dry condition the compressive strength of the corrugated board according to the invention was about 20% higher than that of the conventional board and slightly higher than that of the waxed board, whereas in wet condition the compressive strength of the board according to the invention was still 70% of the corresponding dry value, the conventional board showed a compressive strength amounting to only about 10% of the corresponding dry value. For the waxed board the compressive strength in wet condition was about 20% of the corresponding dry value.

I claim:

1. A method of producing a laminate for use as a fluted layer in a corrugated board comprising at least one fluted layer and at least one flat liner layer, said method comprising the steps of forming a substantially uniform intermediate lamina having a weight of at most 100 g./m.$^2$ and consisting of a thermosetting resin containing a plasticiser between two webs selected from paper and paper board, said webs having a weight per unit area at least as great as that of said intermediate lamina, bonding said webs and resin lamina to each other without essentially impregnating said webs with said resin and without completely hardening said resin, corrugating said laminate to form a fluted layer, and gluing tops of corrugations in said laminate to a flat liner layer with a glue selected from water miscible paper glues and paper board glues after a period of storage.

2. The method as claimed in claim 1, and forming said intermediate lamina by applying a thermosetting resin in a solvent between said webs and subsequently evaporating said solvent.

3. The method as claimed in claim 1, and forming said intermediate lamina by applying a thermosetting resin in a dispresion liquid between said webs and subsequently evaporating the dispersion liquid.

4. The method as claimed in claim 1, and forming said intermediate lamina as a self supporting thermosetting resin film and placing said film between said webs.

5. The method as claimed in claim 1, and forming said intermediate lamina of a thermosetting resin which is pervious to water vapor in thicknesses corresponding to a weight up to at least 100 g./m.$^2$.

References Cited
UNITED STATES PATENTS

| | | | |
|---|---|---|---|
| 1,119,146 | 12/1914 | Ferres | 156—206 X |
| 3,338,767 | 8/1967 | Fuller | 156—206 |
| 3,308,006 | 3/1967 | Kresse et al. | 156—210 X |

CARL D. QUARFORTH, Primary Examiner

S. J. LECHERT, Jr., Assistant Examiner

U.S. Cl. X.R.

156—210, 292